April 13, 1965    J. A. CLARK ETAL    3,177,715
COMBINATION VALVE AND LIQUID LEVEL GAUGE
Filed Sept. 12, 1961    3 Sheets-Sheet 1

INVENTORS
JAMES A. CLARK,
JOHN O. MORRISON,
BY

McMorrow, Berman + Davidson
ATTORNEYS.

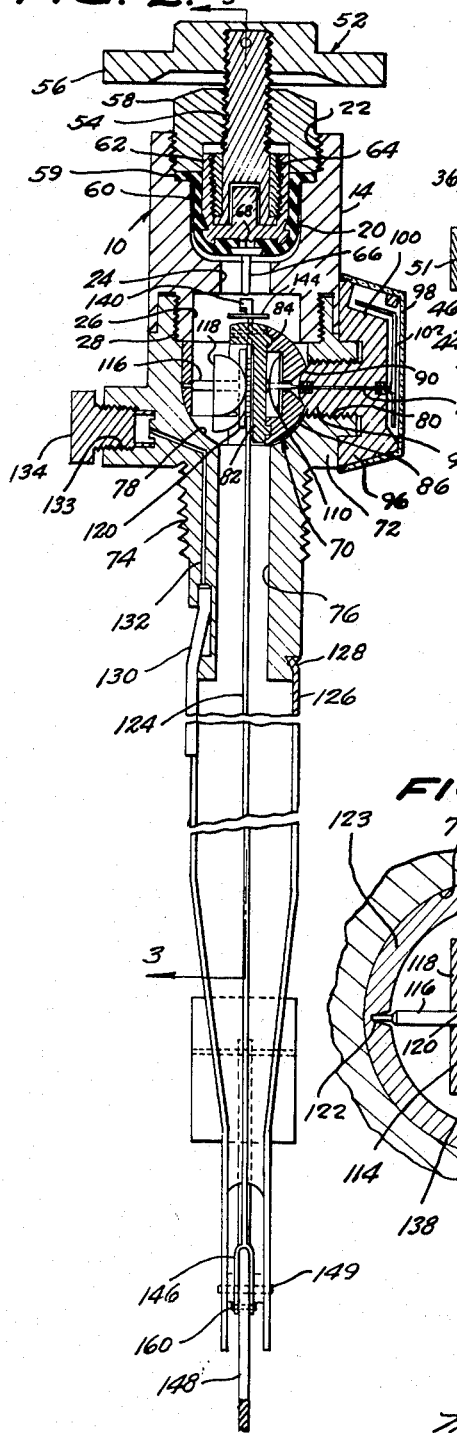

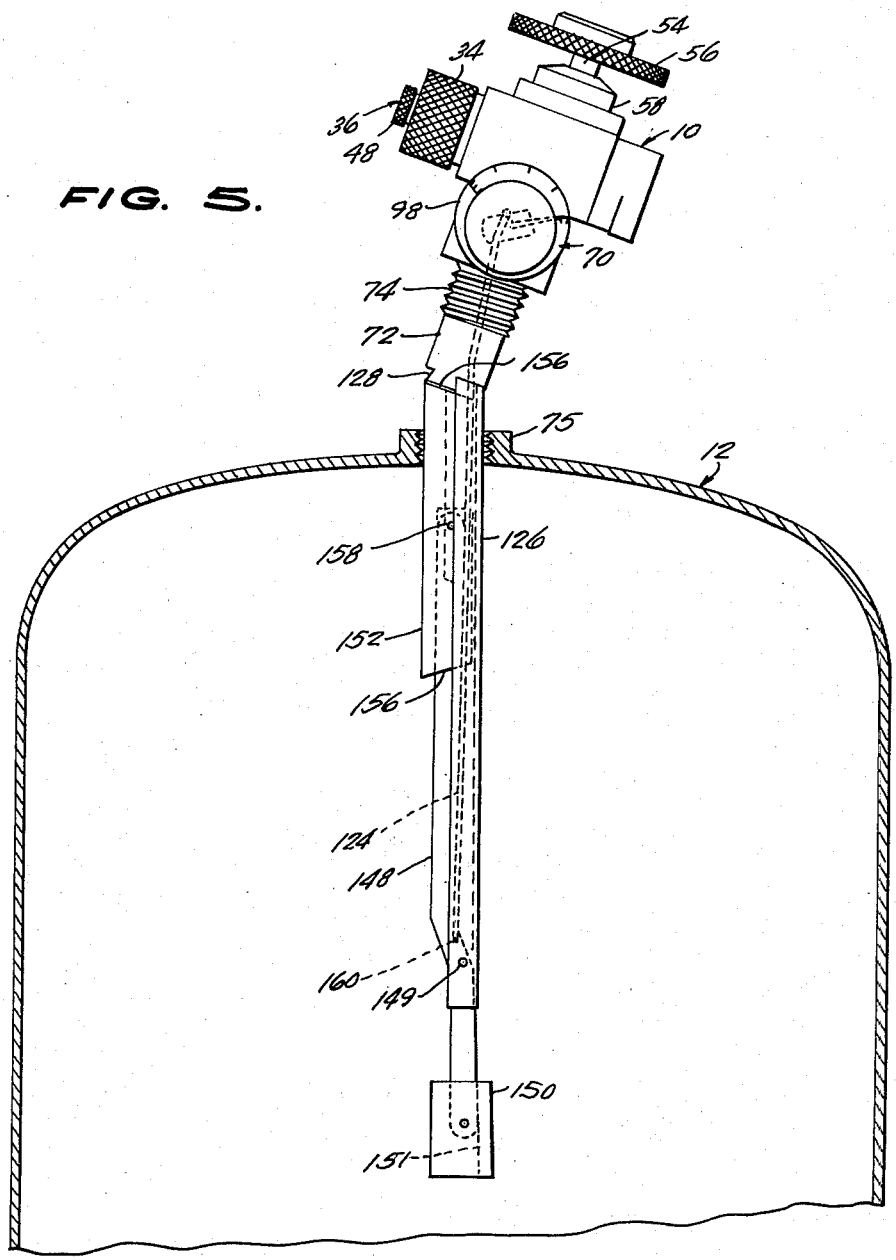

United States Patent Office 3,177,715
Patented Apr. 13, 1965

3,177,715
COMBINATION VALVE AND LIQUID LEVEL
GAUGE
James A. Clark, 1143 W. Diamond St., Butte, Mont., and John O. Morrison, 108 S. 7th St., Worland, Wyo.
Filed Sept. 12, 1961, Ser. No. 138,231
8 Claims. (Cl. 73—306)

This invention relates generally to valves having associated therewith liquid level gauges, and more particularly has reference to an improved gauge construction for incorporation in a valve of this general type. The present invention is usable to particular advantage upon containers of the type in which there are confined liquids having a density less than that of water, such as liquefied gases maintained under pressure, as for example, gases of the hydrocarbon groups, propane, butane, etc.

One important object of the present invention is to provide a generally improved liquid level gauge, which will eliminate joints that have heretofore been required in the vertically swingable float member support arm or lever of the device and will be readily installed in a small standard opening, thus to simplify installation and manufacturing procedures.

Another object is to provide a compact mechanical arrangement, which will eliminate the placement of glass or similar materials under pressure, with this object being achieved by placement of cooperating magnets exteriorly of the container at opposite sides of a sealing partition, thus to provide for an externally disposed pointer assembly in which there is no maintenance of pressure, and through which there is no possibility of leakage, said assembly thus being adapted to be covered by no more than a protective weather cap having a transparent portion at the top defining a view window.

Another object is to provide means in the device which will be operable automatically in a manner to prohibit the gauge from being used as a filling medium, thus to permit compliance with regulations of the Interstate Commerce Commission, or any other governmental regulations which normally specify that the cylinder for which this particular size and model of gauge is intended must be filled by weight only.

Another object is to provide, in a combination valve and liquid level gauge, a self-contained bleeder assembly other than the bleeder in the valve, so designed as to be incorporated directly within the gauge housing in a manner to facilitate more rapid and convenient charging of the cylinder or container than has heretofore been possible, by reason of an arrangement in which the bleeder valve may be used advantageously for permitting the escape of air from the container simultaneously with the inflow of liquid during the charging of the container.

Still another object is to so form the liquid level gauge as to permit it to be connected directly to components of a manually-operable shut-off valve, bleeder valve, and safety relief valve, the entire construction being adapted to simplify manufacture, through the provision of various pre-assembled units, which can be selectively connected to produce a valve capable of discharging a plurality of selected functions. Thus, said units can be assembled to provide a combination shut-off valve, bleeder valve, and safety relief valve. Then again, the components can be assembled to comprise, with minimum modification of said component units, a combination shut-off valve and liquid level gauge. Still further, the arrangement could be utilized to advantage in providing a combination shut-off valve, bleeder valve, safety relief valve, and liquid level gauge, said gauge having a bleeder other than the bleeder in the attached valve.

Another object of importance is to provide a compact arrangement such as to cause the same, when installed upon a standard container adapted to hold gases liquefied under pressure, to extend no higher above the container than conventional valves not having the desirable characteristics of the invention. In this way, it is proposed that the construction remain within authorized height specifications for standard valves designed for use on cylinders or containers of the character referred to above.

Yet another object is to provide a construction, in the pivotal float member and pivoted counterweight means of the device, such as to prevent any fouling of the mechanism of the gauge regardless of the manner in which the container may be positioned, turned, relied or even dropped.

Still another object is to provide, in a gauge of the character stated, a particular shape and relative arrangement of magnets such as to produce maximum sensitivity in a rotary magnetic attraction arrangement. In other words, the shape of the magnets and positioning of said shapes relative to each other produce a much stronger rotary-sensitive magnetic attraction than has heretofore been the case when rotary magnetic attraction is to be set up between two relatively rotatable masses. Said shape and positioning, thus produces an appreciably stronger attraction in the sense of a rotary direction, so to speak, but not otherwise.

A further object of importance is to so design the combination valve and liquid level gauge as to cause the gauge to be automatically locked, in a manner such that it will not reflect the rising level of liquid, whenever the valve is opened for the purpose of refilling an empty container or filling a partially full container. It is this arrangement that produces the safety locking means designed to prevent a violation of governmental regulations with respect to the recharging of containers of this type.

A further object is to so relate the valve and the liquid level gauge as to cause the liquid level gauge to reflect accurately the level of the liquid after the valve has been closed following each charging of the container, with said liquid level thereafter being accurately indicated regardless of the position of the valve in the circumstances.

It is another object of the invention to provide a combination valve and liquid level gauge which will be so designed as to be shipped, completely assembled and adjusted, from the manufacturers. It is proposed, in this regard, that the device will be so designed as to be adapted, after shipment in this form, to be installed in only a few moments upon a standard container, of a size for which the particular size and model of valve and gauge is intended, without any alteration whatever to said standard container.

A further object is to design the device in such a way as to permit manufacture thereof in different sizes for different sizes of containers. It is proposed, in this regard, to especially distinguish the device from gauges of the prior art in that the small size of the small standard container openings will readily accommodate the valve and gauge of the present invention. Thus, in accordance with the invention, said small standard openings of the containers on which the device would be regularly used are not a controlling factor in the installation of the combination valve and gauge of the invention. Reference is here made particularly to the standard three-quarters inch opening of the standard twenty and thirty pound propane and butane containers or cylinders.

It is another important object of the invention that when the device is so installed on said containers, the combination valve and liquid level gauge of the present invention will present an installation which extends no higher above the container than the valve alone heretofore used as standard equipment on said containers, so that the installation of the combination valve and liquid level gauge of the invention will be well within the recognized height specifications of a standard valve not having a gauge means incorporated therein.

Another object is to provide a combination valve and liquid level gauge having an automatic locking means, so adapted mechanically that the indicator of the gauge is always responsive to any fixed level of liquid within the container, and will also be responsive at all times to the progress of the falling level of the liquid in said container, though automatically prohibiting the indication of the progress of the rising liquid level as the container is being filled.

It is a further object to provide a liquid level gauge as described which will nevertheless be so designed and intended that the device may also be assembled by the manufacturer with a locking pawl omitted, whereby the gauge can in this event at all times progressively indicate the liquid level in the container whether said level is rising, falling, or fixed. It is proposed in this regard to permit the device to be used if desired upon containers of the type on which complete indication of the liquid level is permitted by authorized regulations.

A further object is to provide a liquid level gauge so designed for use in combination with a shut-off valve, that a manually operable shut-off means, during its normal operation as a shut-off means, will automatically and simultaneously serve as an important functioning component of the automatic locking device of the gauge, in that the normal mechanical action of the shut-off means will be the controlling factor that effects continuance of the proper function of the automatic locking device of the gauge each time the container is filled.

Another object is to provide a valve so adapted and applied to a liquid level gauge that the manually operable shut-off means of the valve will contact or be connectable to the locking device of the gauge in such a way as to utilize the normal mechanical action of the shut-off means of the valve as the energizing factor that affects continuance of the proper function of the locking device of the gauge, thus to cause said locking device to automatically allow the gauge to indicate the liquid level after the shut-off valve is closed following each filling of the container.

Yet another object is to provide a valve which will operate as set forth in the paragraphs immediately above, with the contact or connection of the manually operable shut-off means to the locking device being effective through a portion of the flow passage of the valve that communicates between the valve and gauge, with the locking device being designed to automatically allow the gauge to indicate the liquid level as the shut-off means is moved to a flow-preventing position following each filling or partial filling of the container.

Other objects will appear from the following description, the claims appended thereto, and from the annexed drawing, in which like reference characters designate like parts throughout the several views, and wherein:

FIGURE 1 is a vertical sectional view through a container equipped with a combined valve and liquid level gauge according to the present invention, the valve and gauge being shown in side elevation, the pivoted float member and associated float member support arm being shown in full and dotted lines in different positions assumed thereby, a portion of the pivoted float member and of the pivoted counterweight being shown in section;

FIGURE 2 is an enlarged longitudinal sectional view through the device substantially on line 2—2 of FIGURE 1;

FIGURE 3 is a sectional view on the same scale as FIGURE 2; taken approximately on line 3—3 of FIGURE 2;

FIGURE 4 is a still further enlarged detail sectional view through the gauge assembly, substantially on line 4—4 of FIGURE 3; and FIGURE 5 is a view showing the container fragmentarily in longitudinal section, and illustrating the device as it appears when being installed on the container.

Figure 1:
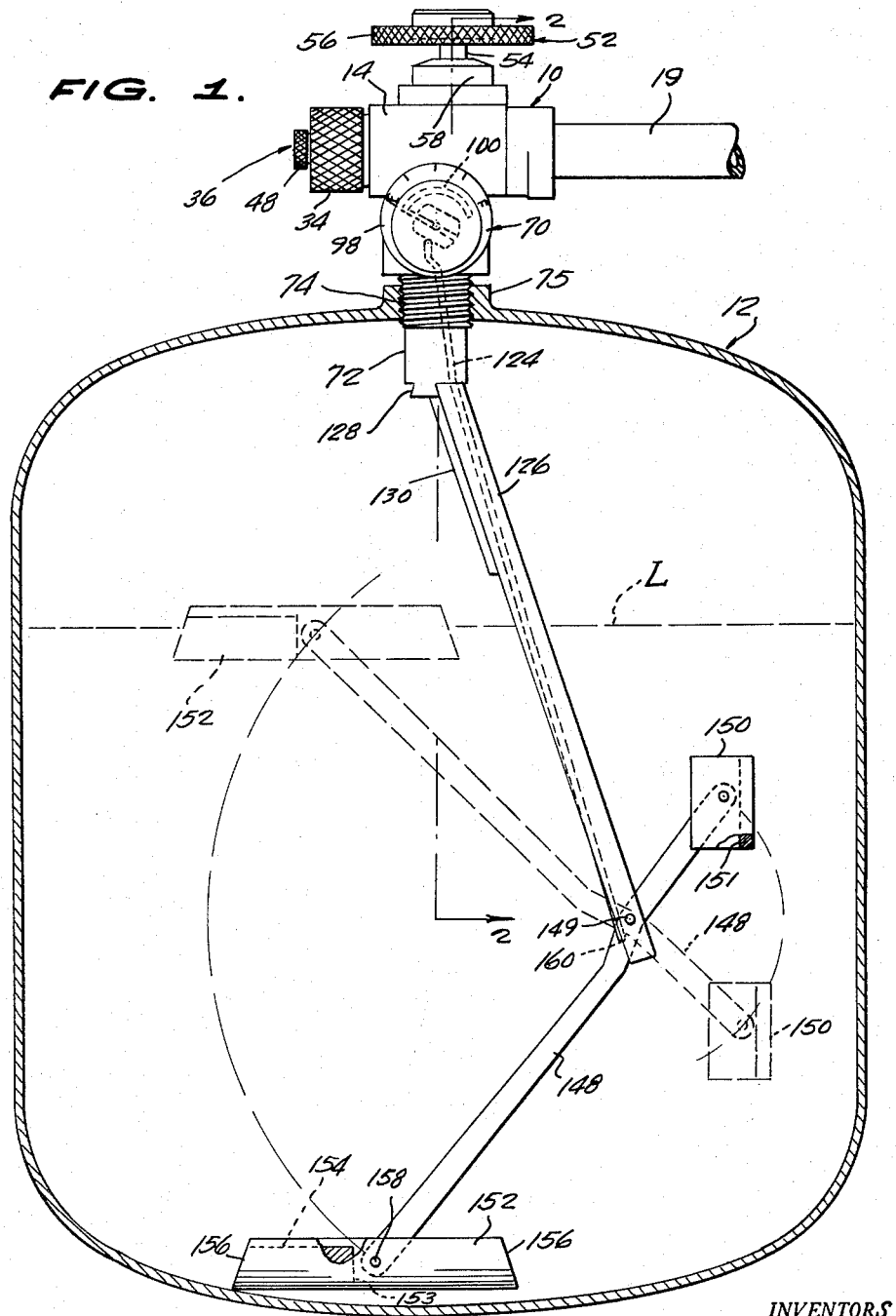

Referring to the drawings in detail, designated generally at 10 is the device comprising the present invention, said device being illustrated as being mounted upon a conventional container or cylinder 12. The container 12 is of a well known type, adapted to maintain liquefied gases, such as propane or butane, under pressure. The device 10 constituting the present invention acts as a valve assembly through which the fluid passes, both during the charging of the container and the discharge of fluid or gases from the container. The device 10 is also a liquid level gauge.

The device comprising the present invention includes a valve body 14, formed at one end with an end portion 16 having a threaded counterbore 18 to which is connectible the discharge line 19. Counterbore 18 at its inner end is in communication with an upwardly opening chamber 20. Chamber 20, at its upper end, has a threaded counterbore 22. At its inner end, the chamber 20 is in communication with a flow passage 24 through which the gases or fluid passes out of the container 12 en route to the line 19.

Flow passage 24 merges at its lower end into a downwardly opening, large diameter recess 26, formed in a depending, externally threaded boss 28 formed upon the body 14. Also communicating with the recess 26 is a relief passage 30, merging into a combination relief valve and bleeder valve chamber or counterbore 32. Chamber 32 is formed in the end portion of the body 14 remote from the end portion 16. The end portion in which the chamber 32 is formed is externally threaded, to receive a cap 34.

Generally designated at 36 is a relief valve and bleeder valve means, including a guide stem 38 extending axially within the chamber 32. Guide stem 38 at its inner end is integral with a collar 40 constituting a valve element, said collar being provided with a replaceable washer adapted to bear against a valve seat 42 surrounding passage 30.

A compression, coil spring 44 abuts at its opposite ends against cap 34 and collar 40 respectively and is adjusted in tension responsive to threading of the cap 34 to a selected location. Formed in the end wall of the cap 34 is a peripheral series of relief ports 46 communicating with atmosphere.

Guide stem 38 is formed with an axial bore 48 communicating with the relief passage 30, and also in communication with bore 48 are branch passages 50 so angled as to direct gases under pressure against the periphery of the valve collar 40, thus serving as a clean-out in the event foreign material has produced a clogging of the relief valve means. Normally closing the bore 48 from communication with the branch passages 50 is a plunger 51 which is threadable in bore 48 to the seated position shown in FIGURE 3.

Generally designated at 52 is a shut-off valve, including a threaded stem 54 on the upper end of which is provided a handle 56. Threaded upon the stem 54 is a nut 58, adapted to bear against an outwardly directed flange 59 provided upon the upper end of a cup-shaped diaphragm 60 that seats within the chamber 20, and which is resiliently elongatable in a vertical direction.

A cup-shaped retainer 62 is provided as a backing for the diaphragm, and is internally threaded to receive a sleeve 64 which bears against an outwardly directed flange provided upon the lower end of the stem 54.

Designated at 66 is a depending accessory pin, provided with a collar 68 embedded against the lower end of the diaphragm.

At this point, it is to be noted that the valve as applied in combination with the liquid level gauge has three particular means, namely, a shut-off valve 52, a safety relief valve, and an efficiently operating bleeder valve designed to bleed air from a container or cylinder during a filling or charging operation, without detaching the filling medium from the shut-off valve outlet, with said bleeder valve being contained within the safety relief valve. The safety relief valve and bleeder valve have been generally designated together by the reference numeral 36 herein.

It will be further noted that the safety relief valve is designed to automatically relieve excess pressure from a container upon a predetermined value.

The bleeder means also has ports directed toward the periphery of the collar 40 of the safety relief valve, so designed as to provide a medium by which sand, moisture, or foreign materials may be removed from the safety relief chamber or bore 32. The bleeder means on the valve should thus be noted as being a particularly advantageous feature, even though the liquid level gauge on which the valve is used, in this particular invention, also has a self-contained bleeder. This will be described in full detail hereinafter.

It is appropriate to note that the energizing or propulsion factor of the gauge components in the interior of the container 12 is induced by a ratio of densities arranged by means of counterbalancing a pivoted body of relatively light metal with a pivoted body of relatively heavy metal, in the interior of the container. As will be brought out in full detail hereinafter, the arrangement is one in which a relatively long stationary support arm extends downwardly from the gauge housing, with a float member support arm pivoted intermediate its ends upon said stationary support arm. A lead counterweight is pivoted on one end of the float member support arm, with a magnesium float member being pivoted upon the other end of said float member support arm. An actuating rod having a pivotal connection at one end to the float member support arm is pivotally connected at its other end to a crank arm attached to a shaft in the indicator head of the housing, said head being a part of the housing mounted in boss 75 on the container exterior.

The pivoted counterweight, consisting of a body of metal having a relatively large density, cooperates with the buoyant force acting upon the float member, which is a body of metal having a relatively light density, to balance the gravitational force exerted on the pivoted float member, thus to maintain the pivoted float member at a position depending upon the liquid level within the container.

With further reference to the liquid level gauge, it will become apparent from the detailed description to follow that a means is provided in the device which operates automatically in a manner to prohibit the gauge from being used as a filling medium, thus to permit compliance with regulations of the Interstate Commerce Commission or any other properly authorized regulations, which normally specify that the cylinder for which this particular size and model of gauge is intended must be filled by weight only. Said means is so designed in the combination valve and liquid level gauge as to cause the gauge to be automatically locked, in a manner such that it will not reflect the rising level of liquid, whenever the valve is opened for the purpose of refilling an empty container or filling a partially empty container. It is this arrangement that produces the safety locking means designed to prevent a violation of governmental regulations with respect to the recharging of containers of this type.

The liquid level gauge assembly 70 is designed to be attached bodily to the body 14, and the gauge assembly 70 includes a gauge housing 72, which extends downwardly from the body 14, and which, at its upper end, is provided with an internally-threaded neck adapted to engage the boss 28.

The housing 72 is integrally formed with a depending, externally-threaded extension 74, the threads of which may be tapered so as to insure that said extension will sealably engage in the complementarily-threaded neck 75 of the container 12. The extension 74 is threaded for only a part of its length, as will be noted from FIGURE 1.

Formed in the extension 74 and in the upper portion of the gauge housing is a bore 76, which is merged at its upper end into a partly spherical cavity 78. Communicating with the cavity 78 is a laterally-opening, threaded bore 80, and extending as a sealing partition across the cavity is a vertically-disposed, generally circular, flat plate 82, one side of which may be formed with a rib 84. A partly spherical support member 86 has a groove 88 adapted to interfit with the rib 84, and on the convex face of the member 86 there is provided a tapered recess 90, opening into communication with the bore 80. A brass-to-brass seal between recess 90 and a shank 94 closes said communication of recess 90 and bore 80.

As shown in FIGURE 4, the tapered recess 90 communicates at its inner, smaller end with a short bore or opening 92.

Threadedly engaged in the bore 80 is the shank 94, formed on a plate 96 adapted to be disposed exteriorly of the valve body. Plate 96 is provided with a flanged cover plate 98. Cover plate 98 may be formed of plastic, or may be of metal, as shown. Cover plate 98 is transparent at least on the top thereof, to provide a sight window through which may be seen a dial face 100 on which suitable calibrations may be shown. The dial face 100 is milled or otherwise formed out of the periphery of the plate 96, and preferably is eccentric to the center of the plate, and concentric to the center of shank 94.

Adapted to traverse the dial face 100 is an index arm 102. In this connection, as shown in FIGURE 4, formed axially in the shank 94 is a bore 104, in which is freely rotatable a shaft or rod 106 secured at its outer end to the index arm 102.

At its inner end, shaft 106 extends into and is rotatable with an elongated bushing or pintle 108, freely rotatable in the bore 92. Pintle 108 is provided at one end with a rounded tip, bearing on a small, flat-faced projection 112 formed upon the adjacent face of the partition 82, and serving entirely as a spacing medium.

A magnet 110 is provided, said magnet having a center opening receiving the bushing 108. The magnet is frictionally engaged with the bushing or pintle 108, to an extent sufficient to cause the pintle 108 and magnet to be connected for conjoint rotation.

Thus, on rotation of the magnet 110, shaft 106 will also rotate, causing the index arm 102 to traverse the dial face 100.

The magnet 110 has a particular shape which has been found to produce especially good results, in practice. As will be noted from FIGURE 2 the magnet 110 is thickest at its mid-width location, and is progressively reduced in opposite directions from said location toward its respective longitudinal edges. The magnet 110 has a convex face directed toward the partition. As will be noted from FIGURE 3, the magnet 110 has straight longitudinal edges, and has oppositely, outwardly-bowed end edges curving about the axis of rotation of the magnet 110.

Referring once again to FIGURE 4, at the side of the partition 82 opposite that at which the magnet 110 is disposed, there is provided a shaft 116, having reduced axial extensions at its opposite ends. Shaft 116 extends through an opening formed in a magnet 118. The magnet 118 is thickest medially between its opposite side edges, and is progressively reduced in thickness in a direction toward its respective side edges. As will be noted, magnet 118 is substantially thicker than magnet 110, and this arrangement has been found to produce particularly advantageous results, in combination with the location and the general shapes of the magnets.

The magnet 118, in the face thereof confronting partition 82, has a recess which is of dovetailed or undercut shape in cross-section. Engaged in said recess is a support bar or shank arm 120, and said crank arm 120 has its length extending at a right angle to the length of the magnet 118.

The shaft 116 extends through the crank arm 120, and projects a substantial distance beyond the face of the magnet 118 that is remote from the partition 82. Shaft 116 rotatably engages in a bearing recess 122, said shaft at its other end, that is, at the end adjacent partition 82, engaging in a bearing recess provided in a projection on said partition.

Designated at 124 is an elongated actuating rod, said rod extending downwardly through the bore 76 as shown to particular advantage in FIGURE 3.

Designated at 126 is an elongated support arm inclined from the vertical. The support arm 126 is transversely-curved, through substantially 130 degrees in a preferred embodiment of the invention. As will be noted from FIGURE 3, at its lower end the housing 72 is provided with a reduced, undercut end portion 128, and the support arm 126 engages against and is welded at 129 to said end portion.

Designated at 130 is a bleeder tube. The bleeder tube in a preferred arrangement is of circular cross-section at its upper end, with said tube having a lower end portion that is of flattened, widened construction. Bleeder tube 130 extends along one side edge of the support arm 126, and at its upper end is in communication with a bleeder passage 132 formed in the housing 72. Passage 132 opens into a threaded counterbore 133, in which is engaged a closure plug 134.

It will be understood that at such time as it is desired to produce a bleeding action for drawing off air while charging the container, one simply loosens the plug 134 so as to communicate passage 132 with atmosphere. The bleeder means is, of course designed to be used whenever a bleeding action is desired.

Designated at 138 is an approximately semi-circular ratchet, having a peripheral series of ratchet teeth extending through substantially one-hundred eighty degrees. The ratchet 138 is engageable by the lower end of a pawl 140, which is pivoted intermediate its ends upon a pin 142 carried by the member 82. Member 82 is provided with a slot in its upper end, within which the pawl is mounted.

The pawl, at its upper end, has a laterally projecting flattened portion 144 constituting a weight on the pawl designed to overbalance the same at one side of the pivot axis thereof. As a result, the weight 144 would ordinarily tend to cause the pawl to rotate in a counterclockwise direction, viewing the same as in FIGURE 3, thus to cause said weighted portion of the pawl to normally shift the pawl to a position engaging the ratchet.

The pawl, at its upper end, also has an inclined cam surface 145, adapted to be engaged by the rounded tip provided upon the lower end of the pin 66, whenever the shut-off valve means 52 is adjusted to a closed position.

The particular manner in which the ratchet operates will be discussed in greater detail hereinafter. At this point, it is sufficient to note that the ratchet 138 is fixedly secured to the crank arm 120, so as to rotate with the crank arm 120 and with the magnet 118 about the axis defined by the shaft 116.

At this point, it may be noted from FIGURE 4 that the shaft 116 at its outer end bears in a semi-cylindrical liner 123, in which the bearing recess 122 is formed, said liner being fixedly engaged in the cavity 78.

At its upper end, the rod 124 is pivotally connected to the crank arm, so that when the rod 124 moves upwardly in FIGURE 3, it would cause clockwise rotation of the crank arm. Conversely, on downward movement of the rod 124 in FIGURE 3, the crank arm would be rotated in a counterclockwise direction.

The means for raising and lowering the crank arm will now be described. At its lower end, rod 124 (see FIGURE 2) is bifurcated as at 146, to embrace a float member support arm 148. The float member support arm is pivoted intermediate its ends on a cross pin 149 extending between the side walls of the stationary support arm 126.

Designated at 150 is a pivoted counterweight of cylindrical formation, extending in a vertical direction. The counterweight 150 would preferably be formed of lead or other material having a high density, that is, great weight in relation to its overall size, and in a preferred embodiment, the counterweight 150 is formed with a longitudinal, end-to-end, deep, relatively narrow slot 151 which extends almost the full diameter of the counterweight as will be readily seen from FIGURE 1.

The arm 148, at one end, extends into the slot 151, and at this end of the arm there is provided a pivotal connection of the arm 148 to the counterweight. The counterweight is connected to arm 148 at a location such that the counterweight will tend to resume a vertical position in the various positions to which the arm 148 may move about its pivot 149. This may be readily noted by comparing the full and dotted line positions of FIGURE 1.

The greatest portion of the length of the arm 148 is disposed at the side of the pivot 149 opposite that at which the pivoted counterweight is located. As will be seen from FIGURE 1, arm 148, at this end thereof, is pivotally connected to an elongated float member 152. The pivoted float member 152 in a preferred embodiment is formed of magnesium, or other material of small density, that is, substantial lightness in relation to its size. In any event, the pivoted float member 152 is elongated, and is of cylindrical shape, being of constant diameter from end-to-end thereof. In a preferred embodment, pivoted float member 152 is provided with a diametrically extending, longitudinal slot 153. Slot 153 extends the full distance from one end of the pivoted float member 152 to a location slightly beyond its midlength point. At this location, slot 153 merges into a reduced extension slot 154 which continues to the opposite end of the pivoted float member 152. Float member 152 is provided with oppositely bevelled end surfaces 156.

Arm 148 extends into slot 153, and is pivotally connected by a pin 158 to the float member 152.

The particular shape, relative arrangement, and slotting of the pivoted counterweight 150 and pivoted float member 152 have been found to produce a particularly effective action, designed to insure maximum accuracy and efficiency in the device, with minimum danger of its being damaged or adversely effected due to rough handling of the container.

It will be understood that the locations of the pivotal connections of the counterweight 150 and float member 152 to the respective, opposite ends of the arm 148 are such that the pivoted counterweight tends to assume a vertical position, while the pivoted float member tends to assume a horizontal position. As touched upon previously herein, the pivoted counterweight 150 will cooperate with the buoyant force acting upon the pivoted float member 152 to balance the gravitational force exerted upon the float member 152, thus to maintain the float member 152 at a position depending upon the depth of the liquid L in the tank. Since the float member support arm 148 moves in accordance with the movement of the pivoted float member 152, the link or actuating rod 124 will be adjusted in accordance with the changes in the position of the pivoted float member 152. The motion of the rod 124 is transmitted through the crank arm 120 to the pointer shaft 106, whereby the pointer 102 will rotate in accordance with the movement of the link or actuating rod 124 to indicate on the dial plate the height of the liquid L in the container. The dial plate of course is suitably calibrated in accordance with the type of liquid contained in the tank and the known response characteristics of the gauge mechanism.

By employing a material of relatively small density for the pivoted float member 152 and a material of relatively large density for the counterweight member 150, a relatively large specific gravity ratio, as between that of the float member and the counterweight, may be obtained.

Of course, while a relatively light metal, such as magnesium or the like, may be employed for the float member 152, other materials of relatively small density may be employed within the spirit of the present invention. Similarly, while a relatively heavy metal such as lead may be employed for the counterweight, other relatively dense materials may be found suitable for this purpose and may be used within the spirit of this invention.

It will be readily understood that the cross sectional area of the counterweight 150 determines the volume of the liquid displaced thereby and thus is a factor in determining the buoyant force exerted upon the counterweight. Other factors involved in the design of the apparatus include the density of the material selected for the pivoted float member 152, the density of the liquid L, the length of the portion of the float member support arm 148 disposed between the pivot or fulcrum point thereof and the pivoted float member as compared with the length of the portion of arm 148 disposed between the fulcrum thereof and the counterweight 150, and the location of the pivot point 160 relative to the pivot point 149.

Considering now the use of the device, it will be understood that at such time as the device is to be initially charged with its contents, the valve 52 is opened, and the container is filled through the line 19. The parts will now appear as in FIGURE 3. Since the container was empty at the time the initial charging thereof began, it will be obvious that the pivoted float member 152 would have been at the bottom of the container in the full line position shown in FIGURE 1, when the charging operation began.

In these circumstances, the ratchet is in the FIGURE 3 position thereof. Since the valve 52 is raised, pin 66 is elevated in respect to the pawl, and the pawl tends to rotate to the FIGURE 3 position. The lower end of the pawl, thus, engages against a tooth 138 at the upper end of the ratchet.

The teeth are so pitched that the engagement of the pawl against the ratchet will prevent the ratchet from turning clockwise in FIGURE 3 as it would when the rod 124 moves upwardly. In other words, during the charging of the container the progress of the rising liquid level is not reflected on the dial, since the rod 124 cannot move upwardly due to the engagement of the pawl against the ratchet. This is as it should be, since containers of this type are to be filled by weight, under appropriate governmental regulations, in particular, regulations established by the Interstate Commerce Commission. In this connection, it is not uncommon for a user to have a partially filled container filled to "full," in which circumstances the indicator would reflect said partial contents of the container, but would not reflect the progress of the rising liquid level as the filling is completed.

In any event, when the container has been completely charged, the valve 52 is of course closed. Pin 66 is lowered by this action, and engages cam surface 145. This turns pawl 140 in a clockwise direction viewing the same as in FIGURE 3, out of engagement with the ratchet. Float member 152 is thus immediately freed to move upwardly to the surface of the liquid, and since arm 148 is pivotally connected to rod 124 at the location designated 160 in FIGURE 1 and in FIGURE 2, the rod will be shifted upwardly. This causes the ratchet to rotate clockwise in FIGURE 3, so that the index arm is turned to indicate the level of the liquid.

Subsequently, the closing or opening of the valve during the normal periodic withdrawal of gases from the container does not affect in any way the pawl or the ratchet. For example, assuming that the valve 52 is closed, said valve will of course rock the pawl out of engagement with the ratchet. However, the ratchet will not move because its position will in these circumstances be maintained by reason of the float member 152 being disposed at the level of the liquid. Then, when the valve is opened once again, the pawl will of course return into engagement with the ratchet. However, counterclockwise rotation of the ratchet in FIGURE 3 is not affected in any way by the pawl, since the pawl will merely ratchet or click over the teeth of the ratchet 138, during the progressive depletion of the liquid from the container.

It will be seen that the locking mechanism described above, has a particular construction and operating characteristic designed to produce an intimate coaction between the shut-off valve 52 and the liquid level gauge assembly. It is to be noted, thus, that the locking means operates automatically, and is so mechanically adapted that the indicator is always responsive to any fixed level of liquid, as well as to the progress of the falling liquid level, while automatically prohibiting indication of the progress of a rising liquid level during filling of the container.

Further, the construction is such that the manufacturer may leave out the pawl. In this event, the gauge will at all times progressively indicate the liquid level whether it be rising, falling, or fixed. This may be desirable where complete indication of a liquid level is permitted by authorized regulations.

It is to be further noted that the liquid level gauge is so designed for use in combination with a shut-off valve that the manually operable valve 52, during its normal operation, automatically and simultaneously serves in coactive relation to the automatic locking device, in that the normal mechanical action of the shut-off valve is the controlling factor continuing the proper function of the locking means each time the container is filled.

More particularly, the continuance of the proper function of the locking means is carried out in a way such that the gauge is automatically allowed to indicate the liquid level responsive to the closing of the shut-off valve following each filling of the container.

Another characteristic of importance may be noted in that the engagement between the shut-off valve 52 and the locking means, produced by the pin 66, results from extension of the pin 66 through that portion of the flow passage of the valve that communicates between the valve and the gauge. This is of importance in that this particularly allows utilization of the normal mechanical action of the shut-off means of the valve as the energizing factor that continues proper functioning of the locking device of the gauge, causing the locking device to automatically allow the gauge to indicate the liquid level as the shut-off means is closed to a flow-preventing position following each filling or partial filling of the container.

Considering now the normal use of the gauge in showing the liquid level, it will be noted that each time there is a rotatable movement of the crank arm 120 and ratchet 138 responsive to a slight depletion of the liquid causing a corresponding lowering of the pivoted float member 152, the magnet 118 will be correspondingly rotated with the crank arm and ratchet. The magnet 118 has a rotary-sensitive attraction directly through the partition 82, for the magnet 110 and as a result the magnet 110 will instantaneously be turned exactly to the same extent as the magnet 118. Therefore, the index arm will be moved across the calibrated face of the dial to reflect the new level of the liquid.

It is to be noted that the arrangement is such as to locate the magnet 110 completely outside of the container interior, flow passage, and any other area in which there is pressure or the flow of gases or liquids. This results from the provision of the sealing partition 82, which locates the magnet 110, shaft 106, dial, and index arm completely outside of the pressure area. Therefore, there can be no liquid or gases whatever leaking into the dial assembly, nor can there be any accidental leakage of gases.

As a result, there is no pressure within the dial assembly, and a pressure loss through said assembly is effectively precluded. No need exists to mount the cover plate of the dial assembly in such a manner as to cause it to produce a sealing or pressure-holding action, and one can relatively loosely mount the dial cover upon the plate 96, without any concern other than to make the same weather-tight.

Still another important characteristic may be found in the device, having to do with the ease of installation thereof. This is shown to particular advantage in FIGURE 5. All components that are disposed within the chamber interior are so proportioned individually, and are so connected and arranged relative to one another, as to permit folding of the container-housed components to a minimum cross sectional size such as will allow all of said components to pass through the small, standard-sized opening of the tank or container during the installation thereof. In this way, the entire device can be completely assembled and adjusted at the factory, and the purchaser need do no more than fold the components in the manner shown in FIGURE 5, insert the same through the container opening, and thread the housing extension 74 into the complementarily threaded neck 75 of the container.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any change in construction that may be permitted within the scope of the appended claims.

What is claimed is:

1. A combination valve and liquid level gauge for mounting on a container adapted to hold a quantity of liquid, comprising: a valve body; a shut-off valve means mounted therein for operation between flow-permitting and flow-preventing positions respectively; a gauge housing connected to said body and having a cavity; a partition extending across said cavity to seal off an area at one side of the cavity from the area at the other side thereof; members rotatably mounted in the respective areas at opposite sides of the partition and adapted to be magnetically attracted to each other, whereby rotation in either direction of one of said members will effect simultaneous rotation of the other member to the same extent and in the same direction; motion-translating means connected to said one member responding to the position of a fixed liquid level and to falling of the liquid level in the container to rotate said one member; index means connected to the other member providing an indication of said level exteriorly of the container; means adapted to prevent said rotation of said one member in one direction whenever said shut-off valve means is open in a flow-permitting position, said one direction being the direction which would be caused by the rising liquid level, were said rotation in said one direction not prevented, and means on the shut-off valve engageable with said last-named means when the shut-off valve is in a flow-preventing position to render said last-named means inoperative.

2. A combination valve and liquid level gauge for mounting on a container adapted to hold a quantity of liquid, comprising: a valve body; a shut-off valve means mounted therein for operation between flow-permitting and flow-preventing positions respectively; a gauge housing connected to said body and having a cavity; a partition extending across said cavity to seal off an area at one side of the cavity from the area at the other side thereof; members rotatably mounted in the respective areas at opposite sides of the partition and adapted to be magnetically attracted to each other, whereby rotation in either direction of one of said members will effect simultaneous rotation of the other member to the same extent and in the same direction; motion-translating means connected to said one member responding to the position of a fixed liquid level and to falling of the liquid level in the container to rotate said one member; index means connected to the other member providing an indication of said level exteriorly of the container; and means adapted to prevent said rotation of said one member in one direction whenever said shut-off valve means is open in a flow-permitting position, comprising a ratchet connected to said one member for rotation therewith, a pawl pivotally mounted within the gauge housing in position to engage said ratchet against movement in said one direction about the axis of rotation of said one member, said pawl normally rocking to a position so engaging the ratchet, and an accessory pin on the shut-off valve means engageable with the pawl in the closed, flow-preventing position of the shut-off valve means and adapted to rock the pawl out of engagement with the ratchet, when the shut-off valve means is in said flow-preventing position.

3. A combination valve and liquid level gauge for mounting on a container adapted to hold a quantity of liquid, comprising: a valve body; a shut-off valve means mounted therein for operation between flow-permitting and flow-preventing positions respectively; a gauge housing connected to said body and having a cavity; a partition extending across said cavity to seal off an area at one side of the cavity from the area at the other side thereof; members rotatably mounted in the respective areas at opposite sides of the partition and adapted to be magnetically attracted to each other, whereby rotation in either direction of one of said members will effect simultaneous rotation of the other member to the same extent and in the same direction; motion-translating means connected to said one member responding to the position of a fixed liquid level and to falling of the liquid level in the container to rotate said one member; index means connected to the other member providing an indication of said level exteriorly of the container; and means adapted to prevent said rotation of said one member in said one direction whenever said shut-off valve means is open in a flow-permitting position, comprising a ratchet connected to one member for rotation therewith, a pawl pivotally mounted within the gauge housing in position to engage said ratchet against movement in said one direction about the axis of rotation of said one member, said pawl normally rocking to a position so engaging the ratchet, and an accessory pin on the shut-off valve means engageable with the pawl in the closed, flow-preventing position of the shut-off valve means and adapted to rock the pawl out of engagement with the ratchet, when the shut-off valve means is in said flow-preventing position, said pawl being weighted to normally rock to a ratchet-engaging position, the pawl having a cam surface engageable by said accessory pin on movement of the shut-off valve means to a flow-preventing position so as to rock the pawl out of engagement with the ratchet.

4. A liquid level gauge comprising a hollow housing; a stationary support arm extending downwardly therefrom; a float member support arm pivoted intermediate its ends upon the stationary support arm; a counterweight and a float member pivoted upon and being formed to at times receive and to be substantially aligned with the respective opposite ends of the float member support arm, said counterweight being of relatively great density and the float member being of relatively small density, whereby the pivoted counterweight will cooperate with the buoyant force acting upon the float member to balance the gravitational force exerted upon the pivoted float member, thus to maintain the float member at a position depending upon the liquid level; index means mounted within the housing; means connected between the float member support arm and the index means adapted to actuate the index means responsive to swinging movement of the float member support arm, whereby to provide a reading of the liquid level; and means mounted within the housing automatically operating to lock the index means and its associated actuating means against operating to reflect a rising level of liquid.

5. A liquid level gauge as in claim 4 wherein said locking means is adapted for response of the index means to any fixed level of liquid as well as to the progress of the falling level of the liquid, said locking means being adapted to wholly prohibit indication of the progress of rising liquid level.

6. A combination shut-off valve and liquid level gauge comprising: a housing; a shut-off valve assembly mounted therein for operation between flow-permitting and flow-preventing positions; a liquid level gauge assembly carried by the housing and including an index means to provide a reading of the liquid level; and locking means acting upon the index means to prevent the same from providing an indication of the progress of a rising of the liquid level, said shut-off valve assembly including means responding to operation of the shut-off valve assembly to release the locking means, following each filling of the container.

7. A combination shut-off valve and liquid level gauge as in claim 6, wherein said shut-off valve assembly is adapted for manual operation, said means of the shut-off valve assembly directly engaging said locking means, and being adapted to utilize the normal mechanical action of the shut-off valve assembly during the movement thereof between said positions of the shut-off valve assembly as the energizing factor effective to release the locking means, thus to cause said locking means to automatically allow the index means to indicate the liquid level on operation of the shut-off valve assembly following each filling of the container.

8. A combination shut-off valve and liquid level gauge as in claim 7 wherein the housing has a flow passage extending between the shut-off valve assembly and said liquid level gauge assembly, said means of the shut-off valve assembly engaging the locking means through the portion of the flow passage communicating between the shut-off valve assembly and the liquid level gauge assembly, said means of the shut-off valve assembly moving with the shut-off valve assembly during operation thereof to a flow-preventing position following at least partial filling of the container, said means of the shut-off valve assembly when so moved engaging the locking means in a manner such as to release the same and permit the index means to indicate the liquid level.

References Cited by the Examiner

UNITED STATES PATENTS

| | | | |
|---|---|---|---|
| 229,571 | 7/80 | Vanduzen | 73—317 |
| 645,069 | 3/00 | Christensen | 73—322.5 X |
| 829,103 | 8/06 | Dixon | 73—322 X |
| 923,073 | 5/09 | Peckham | 73—315 |
| 1,144,998 | 7/15 | Burnham | 73—290.1 X |
| 1,308,620 | 7/19 | Broad | 73—305 |
| 2,121,675 | 6/38 | White | 73—317 X |
| 2,300,614 | 11/42 | Connolly et al. | 73—317 X |
| 2,687,142 | 8/54 | Law | 73—322.5 |

FOREIGN PATENTS

| | | |
|---|---|---|
| 25,855 | 1904 | Great Britain. |
| 564,108 | 1/57 | Italy. |
| 605,249 | 9/60 | Canada. |
| 1,013,143 | 4/52 | France. |
| 1,035,476 | 4/53 | France. |

ISAAC LISANN, *Primary Examiner.*